United States Patent

Seachman

[11] 4,335,305
[45] Jun. 15, 1982

[54] TWISTING GEOMETRY SCANNER UTILIZING STAGGERED LENS ARRAY

[75] Inventor: Ned J. Seachman, Penfield, N.Y.

[73] Assignee: Xerox Corporation, Stamford, Conn.

[21] Appl. No.: 179,204

[22] Filed: Aug. 18, 1980

[51] Int. Cl.³ .................................................. H01J 3/14
[52] U.S. Cl. ..................................... 250/216; 350/451; 358/293
[58] Field of Search .................. 250/216, 211 J, 578; 358/213, 212, 292, 293, 294; 350/167, 169, 114, 116, 451; 353/30, 34

[56] References Cited

U.S. PATENT DOCUMENTS

| | | | |
|---|---|---|---|
| 3,592,542 | 7/1971 | Kaufer | 350/451 |
| 4,080,633 | 3/1978 | Starkweather | 358/293 |
| 4,114,037 | 9/1978 | Westwood | 250/216 |

*Primary Examiner*—David C. Nelms

[57] ABSTRACT

An optical scanning system utilizes a lens array positioned between a scan line and a detector array and inclined at an angle to the axis of the scanned line. The lens array consists of a staggered two-row arrangement, each lens along the same center line imaging alternate line segments, in tiered fashion, onto the detector array.

8 Claims, 7 Drawing Figures

TWISTING GEOMETRY SCANNER UTILIZING STAGGERED LENS ARRAY

BACKGROUND

This invention relates to an optical scanning system and more particularly, to a system utilizing a lens array titled at an angle with respect to an object line which projects an image of the object line onto a tiered array of linear image sensors.

Large arrays of solid-state photosensors, e.g. charge coupled imaging arrays, are currently used in applications such as video cameras and document scanners. The semiconductor fabrication techniques currently employed to manufacture these arrays limit the maximum physical dimension to approximately one inch. These are further limitations, both physical and electrical, which establish a minimum center-to-center distance between adjacent photosensor elements. Thus, in a single linear array, there exists a maximum number of photosensor elements which can be practically fabricated. Since the number of image points resolved with such an array is proportional to the number of photosensor elements in the array, there are potential scanning applications where the available number of photosensors in one array is insufficient to produce the desired image resolution. To overcome this problem, it has been proposed that several short, linear photosensor arrays be aligned along a single axis to provide the effect of one array long enough to provide for all of the bit detection needed. Implementation of long photosensor arrays from a plurality of shorter photosensor arrays requires that a crossover from one array to the next occur at some position along the scan line. Aligning the arrays, for example, so that the last detector of the previous array and the first detector of the next array lie on common centers, requires sensitive opto-mechanical tolerances which could be costly, difficult to maintain in a machine environment, and inconvenient to implement on a production basis.

An improved optical scanning system which addresses this problem is disclosed in U.S. Pat. No. 4,080,633 assigned to the same assignee as the present invention. This reference discloses a flying spot scanning system which utilizes a lens array tilted at an angle to a document scan line to convey the bit position information content of the document scan line onto a tiered array of light sensitive detectors disposed along an axis perpendicular to the axial direction of the scan line. The lens array has a lens of proper focal length associated with each scan segment of the document scan line and the detector array has a detector unit associated with each scan segment of the document scan line, with each detector unit having a detector element corresponding to each bit position of the scan segment associated with that detector unit, such that the information content of each scan segment is recorded on a different one of the tiered detector units of the detector array via a different lens of the lens array. Due to a twisting or axial reorientation of the information content of the scan line produced by the tilted lens array, a tiered or two dimensional (area) array of detector units can be utilized to record the information content of the scan line. Unlike long linear detector arrays, area detector arrays with large numbers of detector elements more easily can be manufactured by conventional manufacturing techniques since they only require a rectangular-shaped semiconductor material wafer on the order of one inch by one quarter inch.

The type of geometry disclosed in the above referenced patent has several characteristics which may not be appropriate for certain applications. The focusing requirements dictate the use of small lenses with short center-to-center spacings. The lens f numbers are relatively high and, to maintain radiometric efficiency, scanning speeds must be at relatively slower rates.

It is an object of the invention to provide an improved optical scanning system utilizing a tilted lens array to image scan segments onto an area array of detector units.

SUMMARY

There is provided, in accordance with the invention, a line scan optical system wherein the imaging means is a staggered double row of lenses each row having a center line on separate but parallel axis, each axis tilted with respect to the axial direction of the scan line. Each lens in a particular row scans alternate segments onto appropriate portions of a detector imaging array.

DRAWINGS

DESCRIPTION

Figure 1:
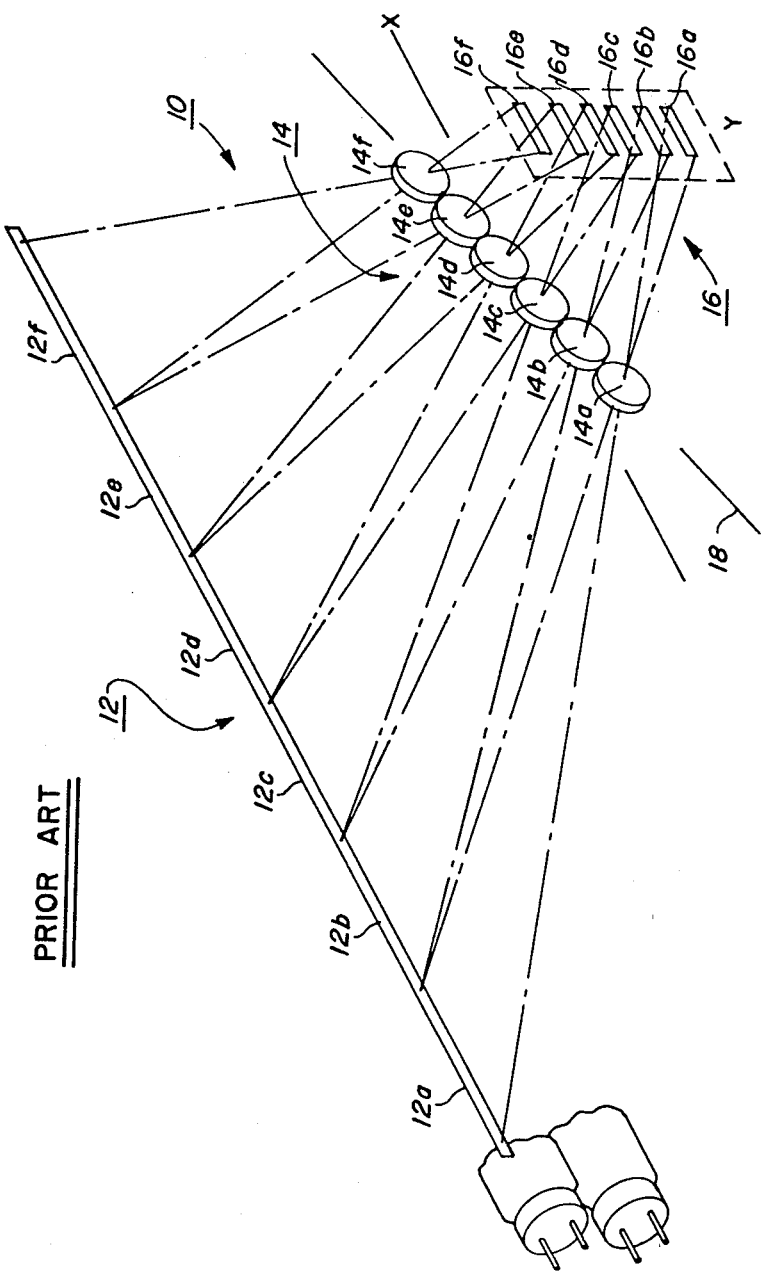
FIG. 1 is a perspective view of a prior art twisted geometry line scan system.

Referring now to FIG. 1, there is shown a prior art twisted geometry optical scanning system 10. Lamps 11 illuminate a document scan line 12. Alternately, a flying spot scanning system (not shown but which may be a laser light beam) can scan in a conventional manner across a scan line 1. The document scan line is linear and may be a portion of an information bearing document which conveys alphanumeric of facsimile information. The scan line can be considered to comprise a plurality of information bearing scan segments 12a–12f of equal length. The portions of the scanning light beam reflected by the information-bearing segments of the scanned line are conveyed by a lens array 14 to an area array of light sensitive detectors 16.

The lens array 14 contains a small lens for each information-bearing segment of the scan line, as shown by lenses 14a–14f and the area detector array 16 likewise includes a detector unit for each of the information-bearing segments of the scan line as shown by tiered detector units 16a–16f. The lens array 14 is disposed within a plane extending parallel to the longitudinal axis of the scan line, with the longitudinal axis 18 of the lens array 14 tilted at an angle to the longitudinal axis of the scan line. The lenses of lens array 14 are of appropriate focal lengths such that the information content of adjacent segments of the scan line is properly focused upon adjacent detectors of the detector array 16. For example, the information content of segment 12a, of the scan line is conveyed by lenslet 14a to detector 16a, the information content of segment 12b of the scan line is conveyed by lenslet 14b to detector 16b. Thus, the lens array 14 provides for projection or transmittance of the segment-wise information content of a scan line extending along a set longitudinal axis to the detector units of a detector array which detector units are disposed along an axis which is orthogonal to the longitudinal axis of the scan line.

In the system shown in FIG. 1, the center coordinates of the image segments are generally uniformly distributed vertically along the array height. For example, with an array height H, and a total number of image segments (lenses) N, the Y-coordinate of the center of the $I^{th}$ image segment is located at $$Y(I) = H(2I-N-I)/2N. \quad (1)$$

Figure 3:
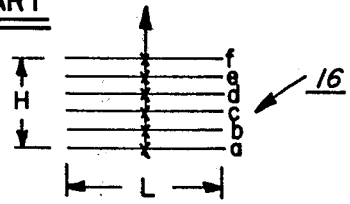
FIG. 3 shows, in detail, the image detector array of FIG. 1.
Figure 4:
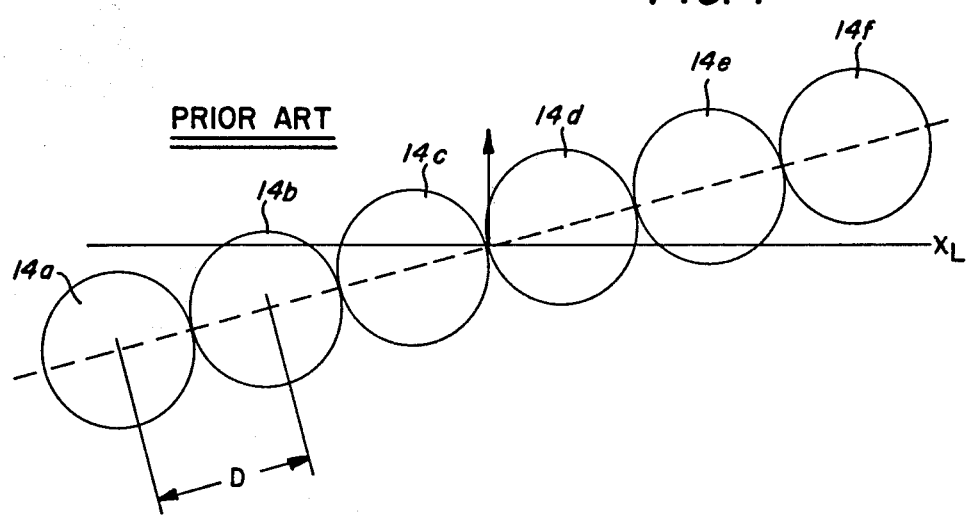
FIG. 4 shows, in detail, the lens array of FIG. 1.

Further, if the centers of each object segment are located at X(I), then the coordinates of the center of each lens can be found from $$X_L(I) = D_i X(I)/(D_i + D_o) \quad (2)$$

$$Y_L(I) = D_o Y(I)/(D_i + D_o)$$

where, $D_i$ and $D_o$ are image and object distances, respectively. An example for the 6 lens embodiment is illustrated in FIGS. 2 through 4.

Figure 2:
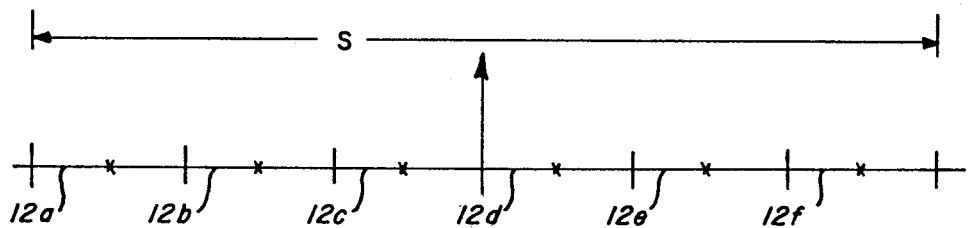
FIG. 2 shows, in detail, the segmented scan line of FIG. 1.

Referring to FIG. 2, the total object scan length S of object center line 12 is 356 mm. The object center coordinates for each of the object segments 12a-12f is represented by an X. FIG. 3 shows array 16 having an array height H of 1.8 mm and an array (image segment) length L of 10.38 mm for each array 16a-16f. The Y coordinates are also represented by an X on the line representing the Y axis. FIG. 4 shows lens array 14 as viewed from the image side with lens center-to-center distance D of 8.84 mm. The lens object distance is 581.86 mm and the image distance is 101.82 mm. The lens center coordinates as well as values of the X and Y coordinates, are given in Table 1 below. This example requires an effective f number of f/14.4 which may be excessively high for many system applications.

TABLE 1

| SEGMENT NO. | OBJECT X(I) | IMAGE Y(I) | LENS $X_L$(I), | $Y_L$(I) |
|---|---|---|---|---|
| 1 | −148.333 | −.750 | −22.092, | −.638 |
| 2 | −89.000 | −.450 | −13.255, | −.383 |
| 3 | −29.667 | −.150 | −4.418, | −.128 |
| 4 | 29.667 | .150 | 4.418, | .128 |
| 5 | 89.000 | .450 | 13.255, | .383 |
| 6 | 148.333 | .750 | 22.092, | .638 |

Figure 5:
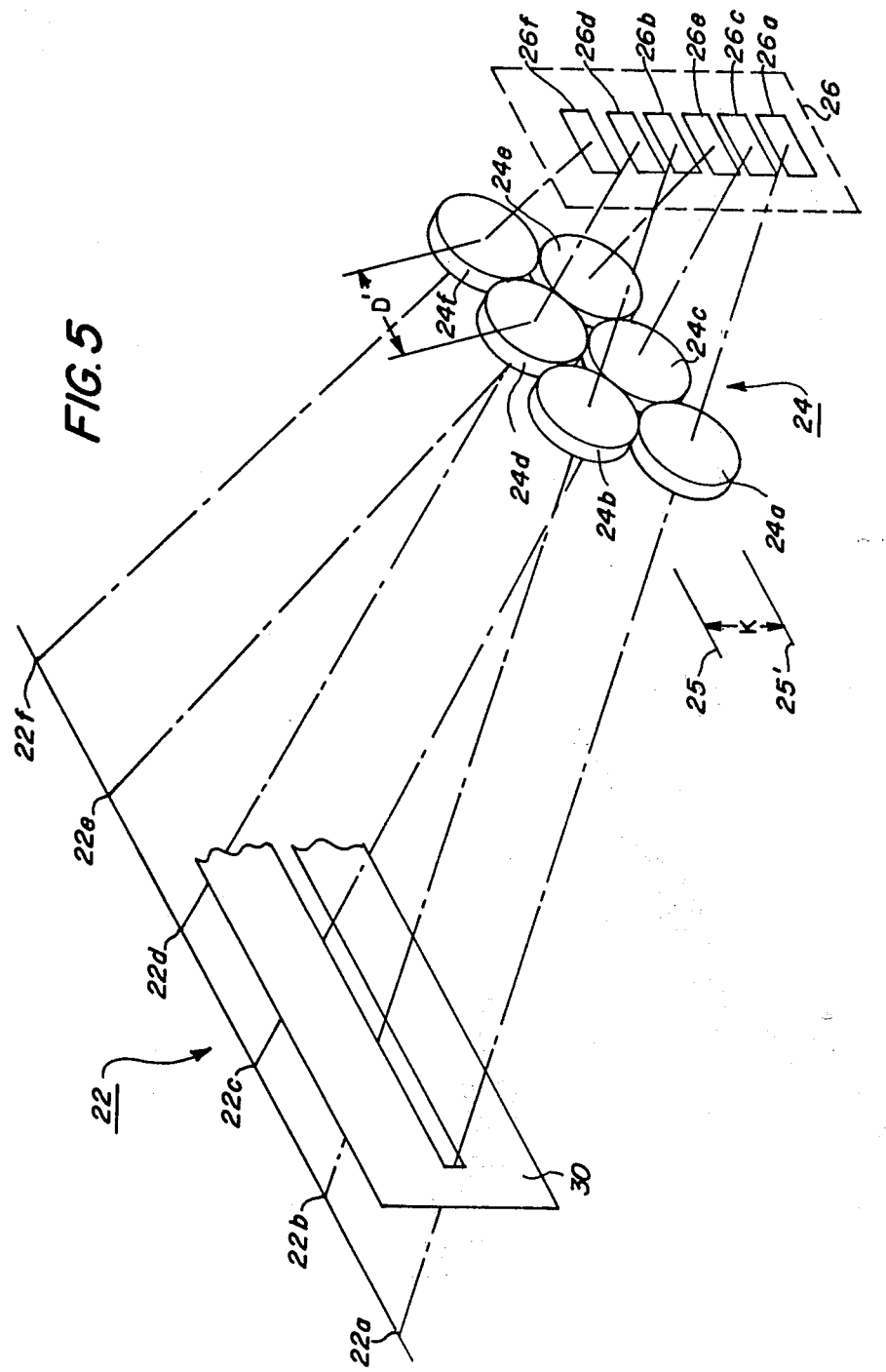
FIG. 5 is a perspective view of a twisted geometry lens scan system having a staggered alternate lens array in accordance with the invention.
Figure 6:
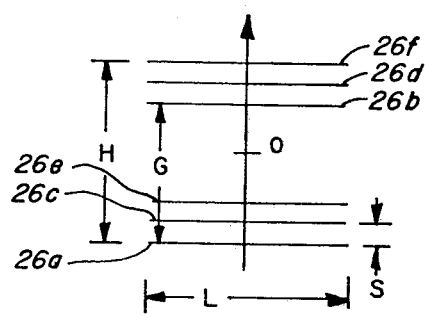
FIG. 6 shows, in detail, the image detector array of FIG. 5.

According to the principles of the present invention, it has been found that if alternate lenses in an array are arranged in a staggered double-row arrangement, rather than the previously disclosed single row arrangement, the permissable lens diameter D' may be substantially increased (f number decreased) accompanied by an increase in radiometric efficiency. D' is the lens center-to-center distance for lenses in any one row. FIG. 5 shows such a double row arrangement. In the figure, scan line 22 of a document is again comprised of six segments 22a-22f which are scanned by a light source (not shown). Lens array 24 consists of six segments 24a-24f, arranged in a staggered arrangement with the centers of lenses 24b, d and f on a line 25 separated from the centers of lenses 24a, c and e on line 25' by a distance K. The area detector array 26 includes a detector unit 26a-26f for each of the information-bearing segments of the scanned line. However, the segments are now imaged onto different portions of the array. Referring to FIGS. 5 and 6, lenses 24b, d and f are of appropriate focal length such that the information content of alternating line segments 22b, d, f of the scan lines are focused upon adjacent detectors 26b, d, f. Similarly, lenses 24a, c and e project line segments 22a, c, e onto detectors 26a, c, e. A field stop 30 is located near the scan line to limit the y-direction extent of the individual images, as formed by each lens.

Figure 7:
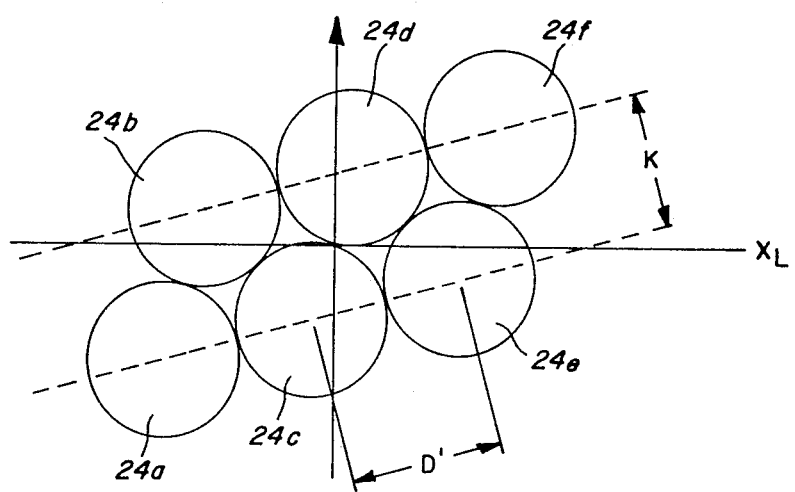
FIG. 7 shows, in detail, the lens array of FIG. 5.

The total height H of the array is a function of the distance K between the center lines of the two rows of lenses shown in FIG. 7. An optimum value of K has been found to be $\sqrt{3}D'/2$. This value provides approximately twice the lens diameter of the previous prior art system while keeping the height of the array at approximately 20 mm. Further increase in center line separation causes unnecessary growth in array height H. Distance G, shown in FIG. 6 is the separation between consecutive image segments. If the lens magnification is M, $$G \approx \sqrt{3} \, D' (M + 1)/2. \quad (3)$$

For an array height, H, and number of segments, N, the separations of adjacent segments in the top or bottom cluster is given by $$S = 2(H - G)/N. \quad (4)$$

A convenient relationship for locating the appropriate image segment centers is $$Y(I) = SI/2 - H/2 \text{ (odd } I) \quad (5)$$

$$Y(I + 1) = Y(I) + G \text{ (even } I)$$

The lens coordinates may then be computed from Equation 2.

EXAMPLE

For the system shown in FIG. 5, total object scan length of line 22 is 356 mm. Lens object distance is 581.86 mm and the image distance is 101.82 mm. Lens center-to-center distance D' is 17.18 mm and image segment length L is 10.38 mm. Array height H=20 mm, consecutive image separation G, by equation (3) is 17.984 mm and S is 0.672 mm (by Equation 4). The object, image and lens center coordinates are given in Table 2 below. In this example, the lens diameter has been increased to twice the diameter of the lenses in the FIG. 2 embodiment effectively halving the effective f/number. Radiometric efficiency is increased in a geometric relationship to approximately four times that of the system of FIG. 2.

Composite detector array 16 can be conveniently fabricated, using two long, thin silicon chips, each containing three linear arrays, aligned and bonded to a common substrate of slightly larger than the values of H and L above. An alternate method of making the array would be to fabricate six linear detectors on a single silicon chip.

TABLE 2

| SEGMENT NO. | OBJECT X(I) | IMAGE Y(I) | LENS $X_L$(I), | $Y_L$(I) |
|---|---|---|---|---|
| 24a | −148.333 | −9.664 | −22.092, | −8.225 |

TABLE 2-continued

| SEGMENT NO. | OBJECT X(I) | IMAGE Y(I) | LENS $X_L(I)$, | $Y_L(I)$ |
|---|---|---|---|---|
| 24b | −89.000 | 8.320 | −13.255, | 7.081 |
| 24c | −29.667 | −8.992 | −4.418, | −7.653 |
| 24d | 29.667 | 8.992 | 4.418, | 7.653 |
| 24e | 89.000 | −8.320 | 13.255, | −7.081 |
| 24f | 148.333 | 9.664 | 22.092, | 8.225 |

I claim:

1. An optical system wherein a line is scanned by a light source and the reflected light is projected by a plurality of lenses onto an area detector array, said system including:
   a first array of lenses having their centers lying on a first axis tilted with respect to the axial direction of the scan line, each lens adapted to project images of a first group of alternating segments of said scan line onto a first group of tiered linear detector arrays, and
   a second array of lenses having their centers lying on a second axis parallel to said first lens array axis, each lens of said second array adapted to project a second group of alternating line segments onto a second group of tiered linear detector arrays.

2. The optical system of claim 1 wherein the lenses of each array have a center-to-center spacing distance D' and two lens array axes are separated by a distance approximately equal to $$\frac{\sqrt{3} \, D'}{2}$$

3. The optical system of claim 2 wherein the distance G on said area array which represents the separation between two detector arrays upon which are imaged adjacent line segments is given by the expression $$G = \frac{\sqrt{3} \, D' \, (M + 1)}{2}$$

where M is the lens magnification.

4. The optical system of claim 2 wherein the distance S on said area array which represents the separation between adjacent detector arrays is given by the expression $$S = \frac{2 \, (H - G)}{N}$$

where H is the area array height and N is the total number of detector arrays.

5. The optical system of claim 1 wherein said first and second groups of tiered arrays are formed and bonded to a common substrate.

6. The optical system of claim 1 wherein said first and second groups of tiered arrays are formed on a single substrate.

7. The optical system of claim 1 further including a field stop between said scan line and said plurality of lenses, said field stop adapted to limit the y-direction extent of the individual lens.

8. An optical scanning system for scanning an object line extending in a predetermined axial direction and having a plurality of segments, said system comprising:
   means for illuminating said object line with light,
   an area detector array including a plurality of detectors oriented along an axis perpendicular to said line axial direction,
   a first array of lenses oriented along an axis tilted with respect to the line axial direction, the first lens array adapted to project images of a first group of alternate line segments onto a first group of adjacent detector units, and
   a second array of lenses oriented along an axis parallel to said first lens array axis, the second lens array adapted to project images of a second group of alternate line segments onto a second group of adjacent detector units.

* * * * *